United States Patent [19]
Cheng

[11] Patent Number: 5,545,322
[45] Date of Patent: Aug. 13, 1996

[54] COLD AND HOT WATER COMBINATION FILTERING FAUCET

[76] Inventor: Ting K. Cheng, 15445 Proctor Ave., City of Industry, Calif. 91745

[21] Appl. No.: 357,692

[22] Filed: Dec. 16, 1994

[51] Int. Cl.⁶ .............................. B01D 35/02; E03C 1/04
[52] U.S. Cl. ............................... 210/440; 4/288; 4/678; 137/801; 210/459
[58] Field of Search .............................. 4/288, 675, 678, 4/DIG. 14; 137/594, 597, 602, 603, 801; 210/203, 459, 497.01, 437, 438, 440, 443, 232

[56] References Cited

U.S. PATENT DOCUMENTS

| | | | |
|---|---|---|---|
| 982,982 | 1/1911 | Mueller | 210/497.01 |
| 986,720 | 3/1911 | Kenney | 210/440 |
| 1,449,822 | 3/1923 | Kohler | 137/603 |
| 1,680,333 | 8/1928 | Kooperstein | 137/603 |
| 5,057,214 | 10/1991 | Morris | 137/597 |
| 5,417,348 | 5/1995 | Perrin et al. | 137/801 |

*Primary Examiner*—Joseph W. Drodge
*Attorney, Agent, or Firm*—Pro-Techtor International

[57] ABSTRACT

A cold and hot water combination filtering faucet including a main body and a filter unit integrally disposed on the main body. The main body includes a cold raw water incoming tunnel and a hot raw water incoming tunnel. The cold raw water incoming tunnel extends to a form a cold raw water outgoing passage for conducting cold raw water through the filter unit. The filtered clean water is conducted through a filtered water discharging tube to be discharged outside. The hot raw water incoming tunnel extends toward the main body to communicate with a water discharging tube thereof.

3 Claims, 6 Drawing Sheets

COLD AND HOT WATER COMBINATION FILTERING FAUCET

BACKGROUND OF THE INVENTION

The present invention relates to a cold and hot water combination filtering faucet comprising a main body and a filter unit disposed on the main body. The main body includes a cold raw water incoming tube and a hot raw water incoming tube. The cold raw water incoming tube extends to form a cold raw water outgoing passage for conducting cold raw water through the filter cartridge for filtering impurities away. No external filtering apparatus is needed in such faucet.

In conventional cold and hot water combination faucet, in order to prevent the hot water from damaging the filtering apparatus added to the faucet and prevent the impurities or sediments produced in the hot water tube from contaminating the filtering apparatus and affecting the filtering effect, it is impossible to install the filtering apparatus directly inside the faucet. Instead, an external filtering apparatus is connected with a cold water incoming tube of the faucet for filtering purpose. Such external filtering apparatus and the faucet often fail to form a unified structure and additional room is occupied. Moreover, the water is likely to leak outside. Therefore, it is necessary to provide an improved faucet which is equipped with an internal filtering apparatus to eliminate the above shortcomings.

SUMMARY OF THE INVENTION

It is a primary object of the present invention to provide a cold and hot water combination filtering faucet which includes a filter unit-integrally disposed on the main body of the faucet as an integral body, wherein the hot water passage is effectively isolated from the filter unit so that the hot water is prevented from back flowing and contaminating the filter cartridge.

It is a further object of the present invention to provide the above faucet in which the cold and hot water passages are completely isolated from each other so that the impurities produced in the hot water passage is prevented from contaminating the filter cartridge and the filtered cold water.

It is still a further object of the present invention to provide the above faucet in which the filter cartridge is made of irreversible infiltration filtering material so as to prevent the hot water from flushing back into the filter core.

It is still a further object of the present invention to provide the above faucet in which the cold and hot raw water passages are completely isolated from the filtered water discharging tube so as to eliminate the problem of contamination by impurities.

It is still a further object of the present invention to provide the above faucet in which a switch is disposed between the cold and hot water passages, whereby when using the hot water, the cold and hot water passages are isolated from each other so as to prevent the hot water from back flowing into the filter cartridge and contaminating the same. It is still a further object of the present invention to provide the above faucet in which the filtered water is conducted directly into a filtered water discharging tube disposed above the filter housing without being conducted back into the main body of the faucet so as to simplify the structure thereof and reduce the manufacturing cost therefor.

The present invention can best understood through the following description and accompanying drawings, wherein:

DETAILED DESCRIPTION OF THE PREFERRED EMBODIMENTS

Figure 1:
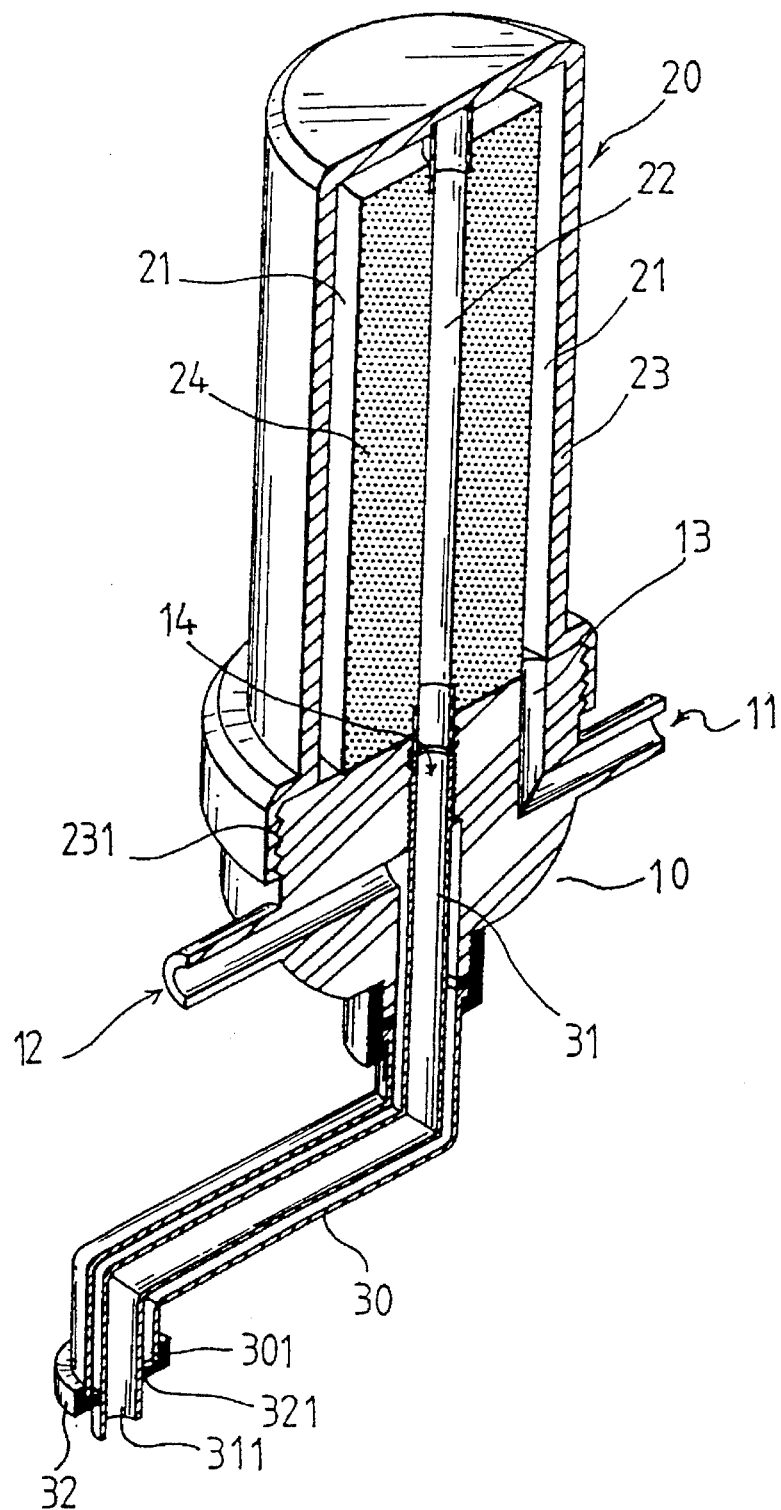
FIG. 1 is a perspective sectional view of a first embodiment of the present invention.
Figures 2A, 2B:
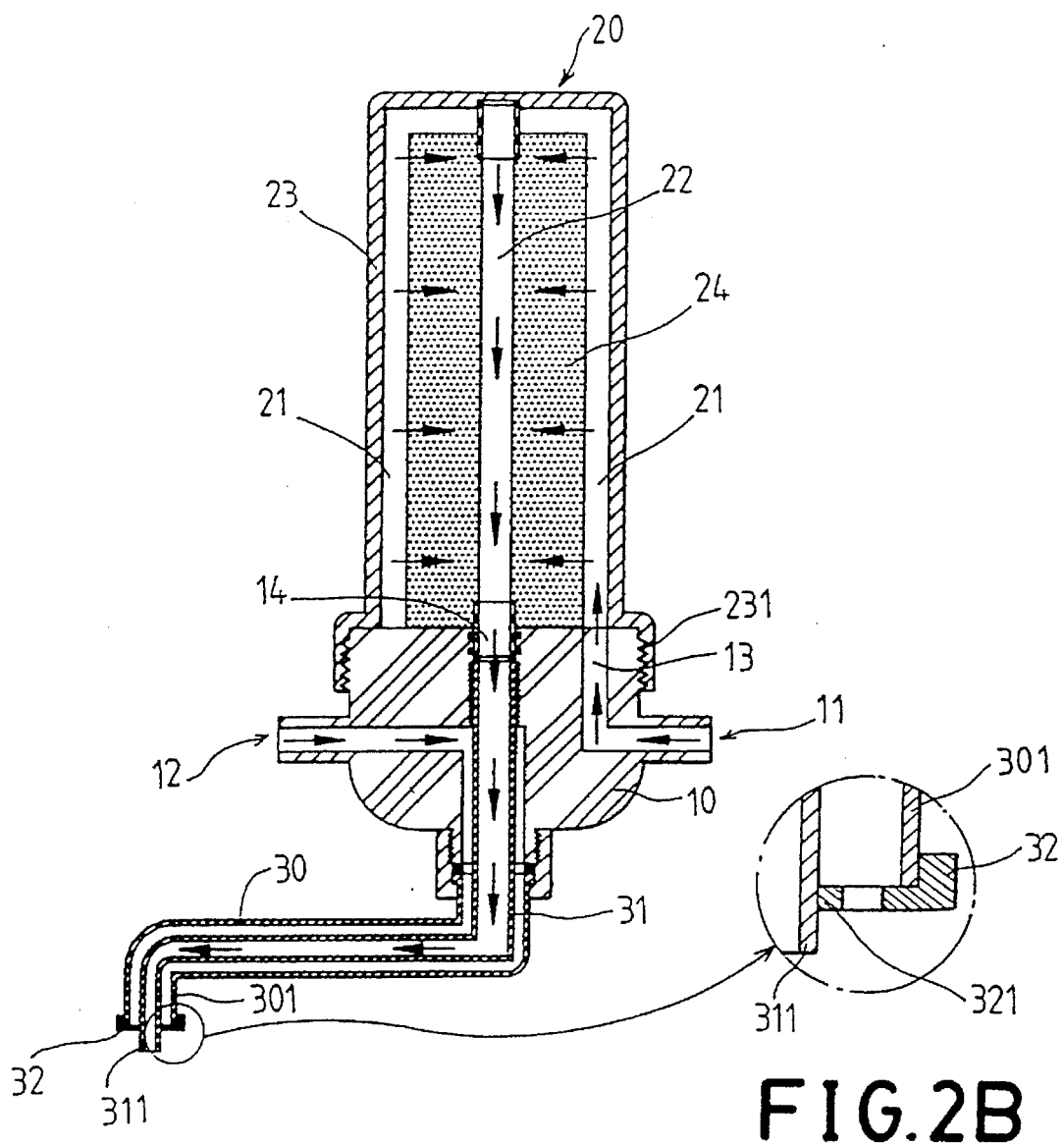
FIG. 2 is a longitudinal sectional view according to FIG. 1.

Please refer to FIGS. 1 and 2. The present invention includes a main body 10, a filter unit 20 composed of a filter housing 23 and a filter cartridge 24, and a water discharging tube 30.

The main body 10 includes a cold raw water incoming tunnel 11 and a hot raw water incoming tunnel 12 on lateral sides. The cold raw water incoming tunnel 11 extends to form a cold raw water outgoing passage 13 which is open to a raw water area 21 of the filter unit 20. The hot raw water incoming tunnel 12 extends toward the main body 10 and turns in a bending direction of the water discharging tube 30 to protrude outside the main body 10 along with the water discharging tube 30. An end 311 of a cold water discharging tube 31 protrudes outside an end 301 of the water discharging tube 30. In order to keep the stable relationship between the end of the cold water discharging tube 31 and the end of the water discharging tube 30, a retaining ring 32 is fitted on the end 311 of the water discharging tube 31. The retaining ring 32 is formed with a central retaining hole 321 for binding the end of the cold water discharging tube 31.

The filter housing 23 has a base portion 231 for engaging with the main body 10 and an interior for receiving the filter cartridge 24. The filter cartridge 24 is made of suitable filtering material and formed with a central hollow clear area 22. One end of the filter cartridge 24 is affixed on the main body 10 with the clear area 22 aligned with and adjoined with a filtered water incoming passage 14 of the main body 10. The raw water area 21 is defined between the filter cartridge 24 and the filter housing 23.

According to the above arrangements, after the cold and hot raw water incoming tunnels 11, 12 are respectively connected with a cold and a hot water sources, when the cold raw water is transferred into the main body 10 through the cold raw water incoming tunnel 11, the cold raw water is conducted into the raw water area 21 of the filter unit 20. The cold raw water then passes through the filter cartridge 24 to filter away the impurities and enters the clear area 22 as clean water. The clean water then passes through the filtered water incoming passage 14 of the main body 10 to be discharged from the cold water discharging tube 31. On the other hand, the hot raw water is directly transferred into the main body 10 from the hot raw water incoming tunnel 12 and discharged from the discharging tube 31. With respect to the above cold and hot water combination faucet, the hot water passage and cold filtered water passage are independent from each other thoroughly so that the sediments which are likely to be produced in the hot water passage will not contaminate the filtered water passage and therefore it is ensured that a user can obtain completely clean filtered water from the present invention. In addition, the hot water is prevented from entering the filter cartridge 24 to contaminate the same so that the using life of the filter unit can be prolonged.

Figure 3:
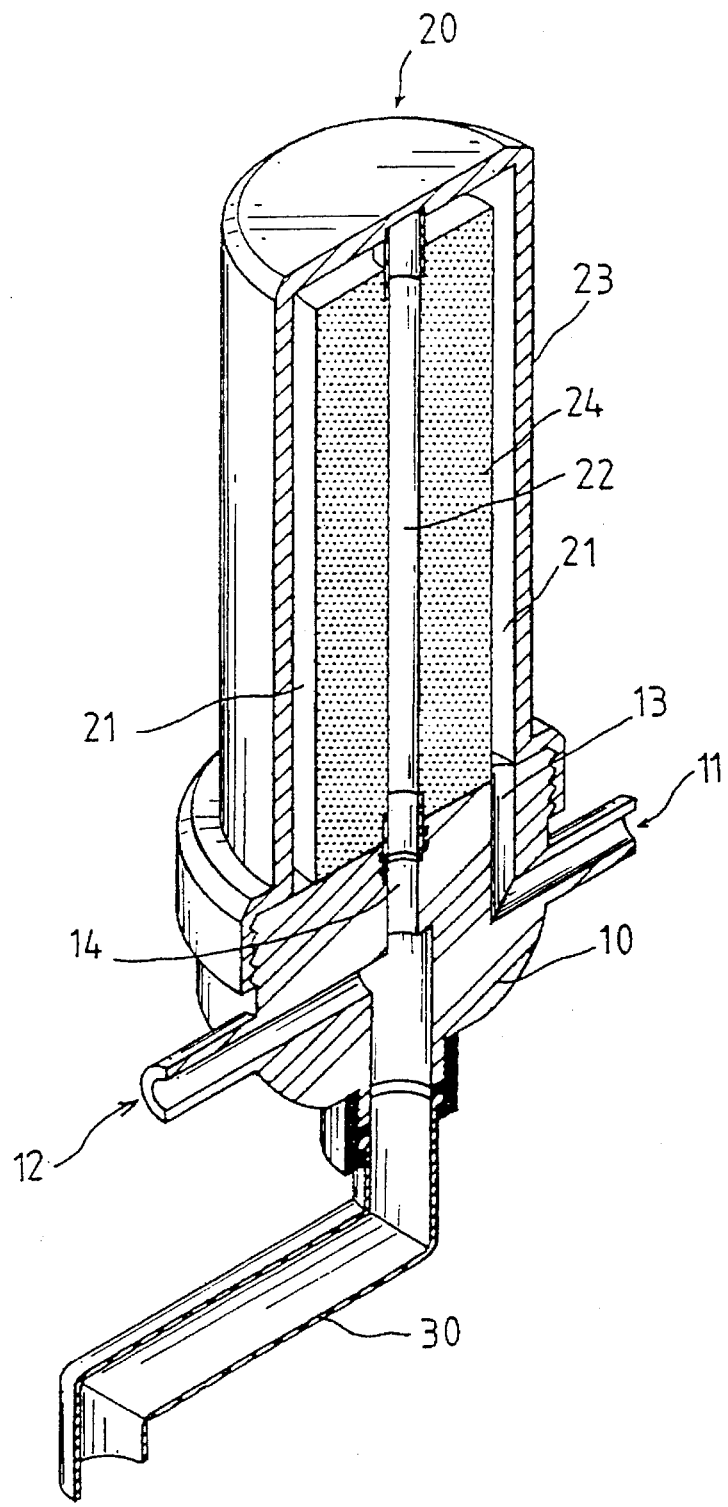
FIG. 3 is a perspective sectional view of a second embodiment of the present invention.
Figure 4:
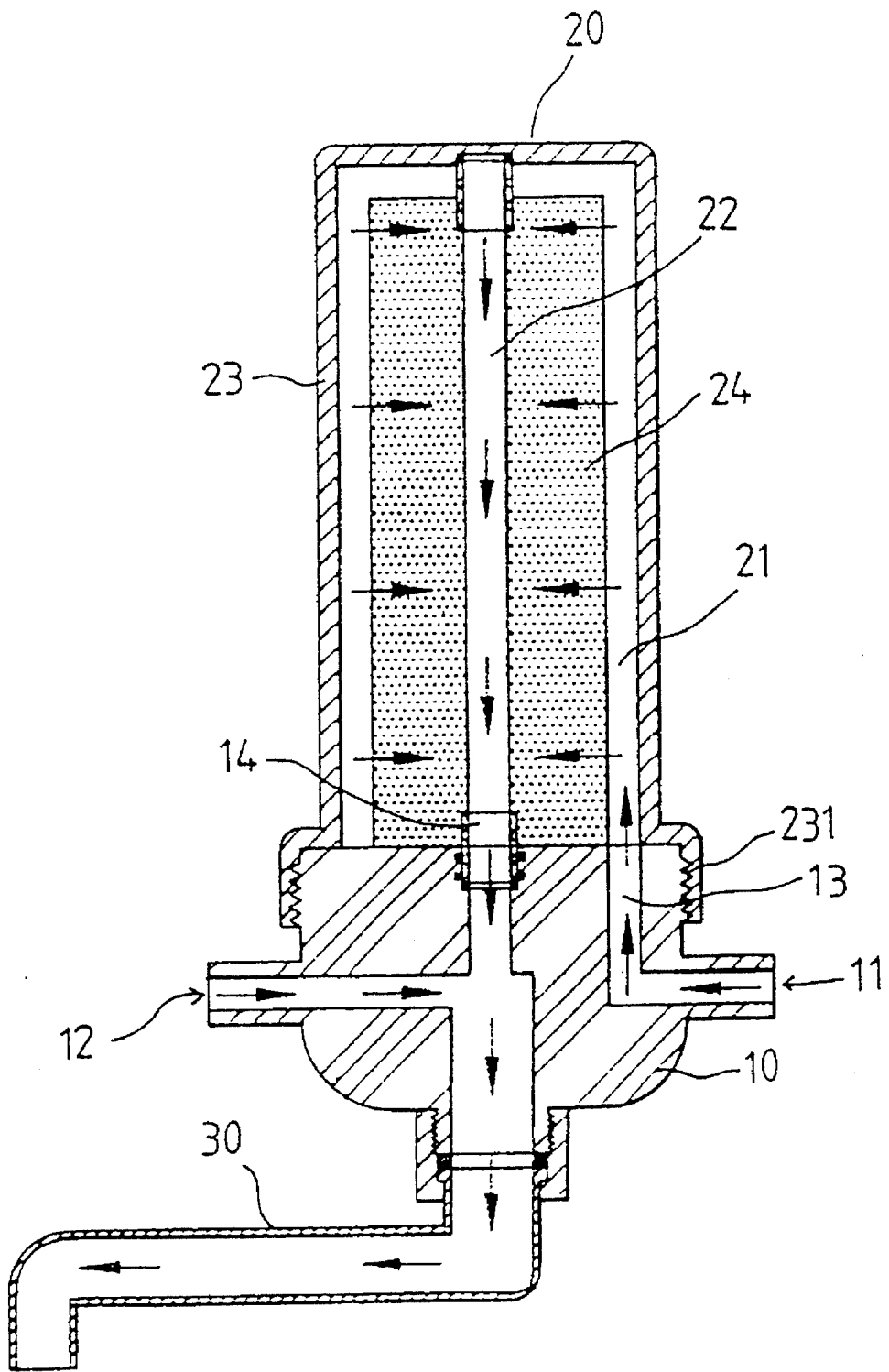
FIG. 4 is a longitudinal sectional view according to FIG. 3.

Please refer to FIGS. 3 and 4. The filter cartridge 24 can be alternatively provided with a reuseable filter cartridge, the cold water discharging tube 31 can be omitted, permitting the cold and hot water to be mixed in the main body 10 and discharged together from the water discharging tube 30.

Figure 5:
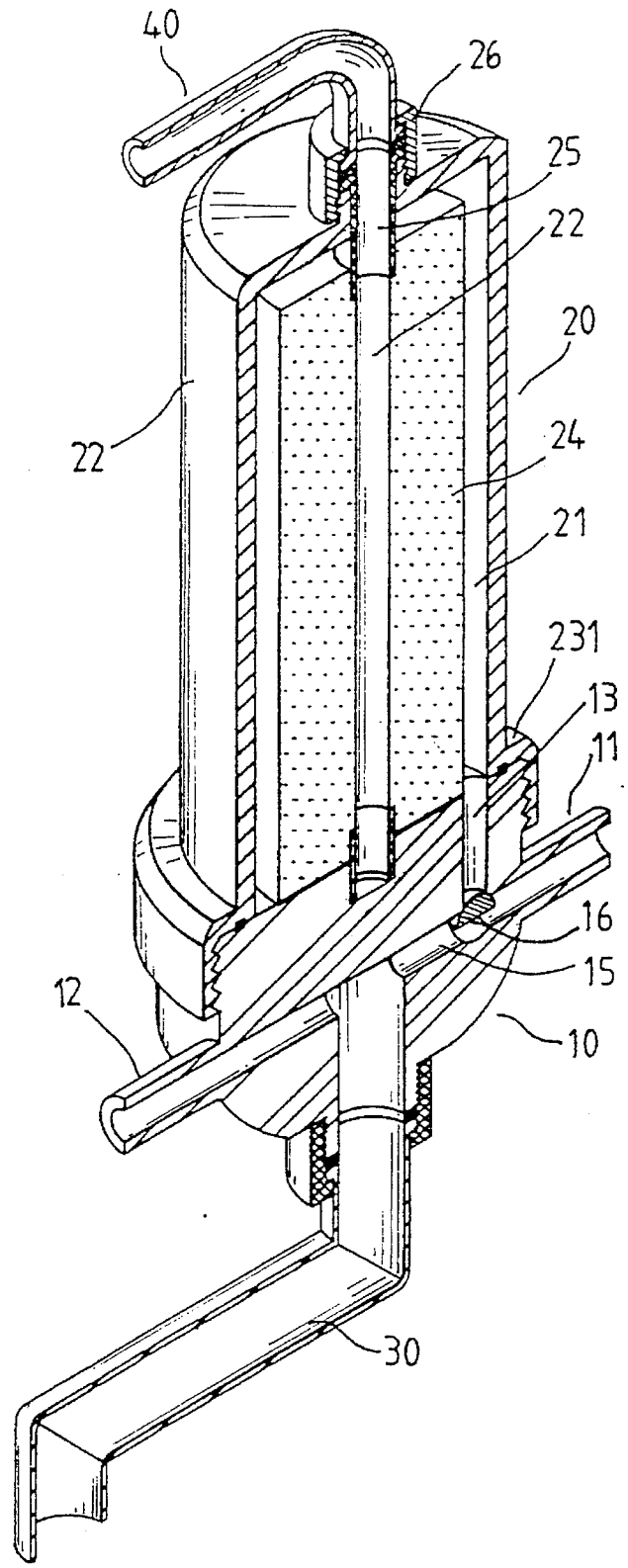
FIG. 5 is a perspective sectional view of a third embodiment of the present invention.
Figure 6:
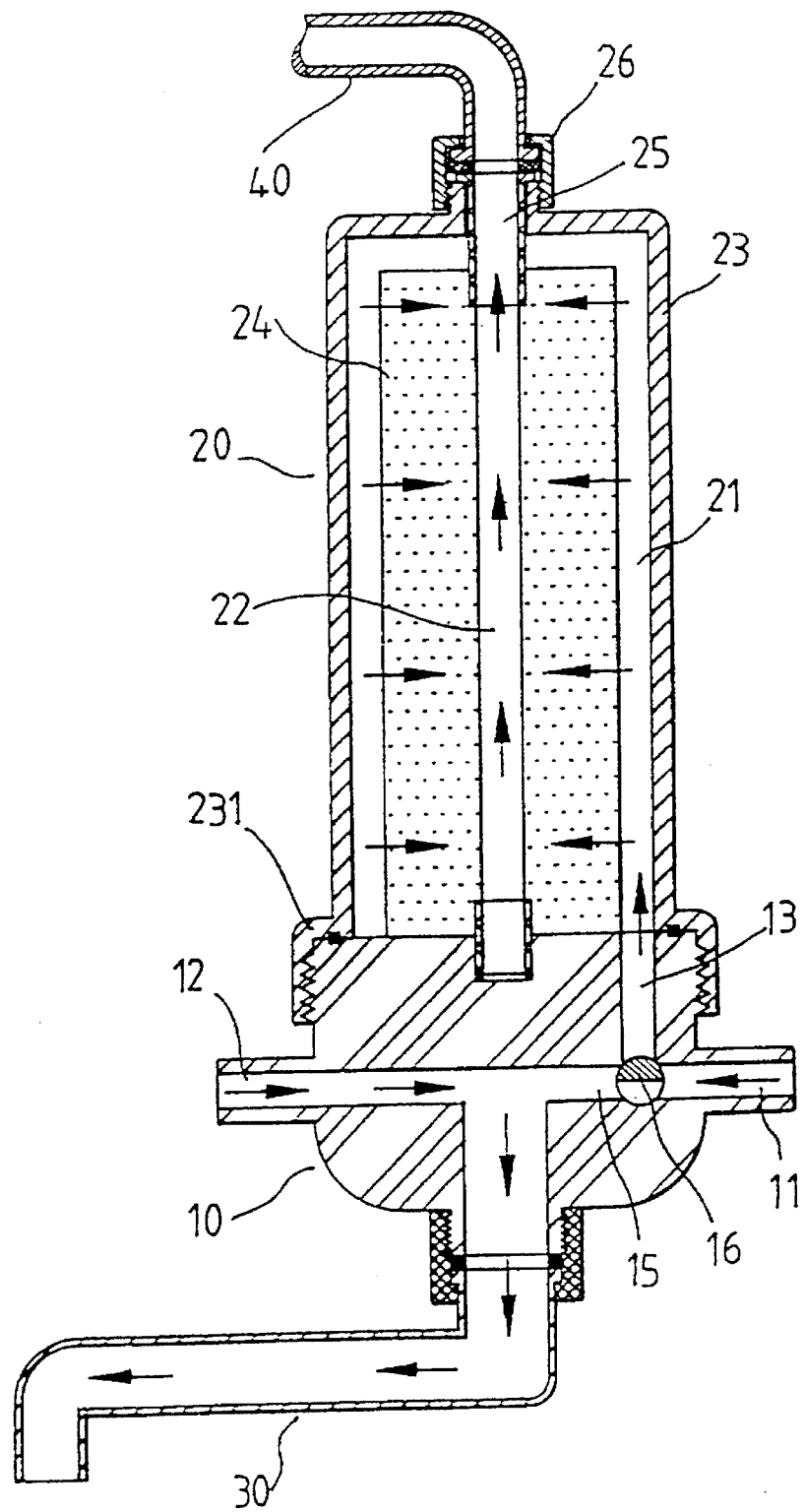
FIG. 6 is a longitudinal sectional view according to FIG. 5.

Please refer to FIGS. 5 and 6. In another embodiment of the present invention, the faucet includes a faucet main body 10, a filter unit 20, a water discharging tube 30 and a filtered water discharging tube 40.

The main body 10 includes a cold raw water incoming tunnel 11 and a hot raw water incoming tunnel 12 on lateral sides. The cold raw water incoming tunnel 11 extends to form a cold raw water outgoing passage 13 which is open to a raw water area 21 of the filter unit 20. The hot raw water incoming tunnel 12 extends toward the main body 10 to connect with the water discharging tube 30 and communicate with the cold raw water incoming tunnel 11 by an inner connecting passage 15. A switch 16 is disposed at an adjoining portion between the connecting passage 15 and the cold raw water outgoing passage 13, whereby the switch 16 can be used to open or close the connecting passage 15 so as to control the flowing direction of the cold raw water.

The filter unit 20 is composed of a filter housing 23 and a cylindric filter cartridge 24. The filter housing 23 has a base portion 231 for engaging with the main body 10 and an interior for receiving the filter cartridge 24. The filter cartridge 24 is made of suitable filtering material and formed with a central hollow clear area 22. An opening 222 is formed at the top of the filter housing 23 and a water conducting tube 25 is installed in the opening 222. One end of the water conducting tube 25 is connected with the clear area 22 while the other end thereof extends outward to connect with a filtered water discharging tube 40 by a threaded sleeve 26.

According to the above arrangements, after the cold and hot raw water incoming tunnels 11, 12 are respectively connected with a cold and a hot water sources, when the cold raw water is transferred into the main body 10 through the cold raw water incoming tunnel 11, if the switch 16 is so located as to open the connecting passage 15, the cold raw water is permitted to flow through the connecting passage 15 toward the water discharging tube 30 and is discharged therefrom. Reversely, if the switch 16 is so located as to block the connecting passage 15, the cold raw water flows through the cold raw water outgoing passage 13 into the raw water area 21 of the filter unit 20 for the filter cartridge 24 to filter away impurities. Thereafter, the filtered water enters the clear area 22 as clean water and is conducted through the water conducting tube 25 and discharged from the filtered water discharging tube 40. When using hot water, the hot water is transferred through the hot raw water incoming tunnel 12 into the main body 10 and then conducted to the water discharging tube 30 for discharging. At this time, the switch 16 is located at the blocking position to close the connecting passage 15 so that the hot water is prevented from flowing through the connecting passage 15 and the cold raw water outgoing passage 13 into the filter unit 20 and contaminating the same. In addition, the filtered water discharging tube 40 is completely isolated from the hot water discharging tube so that the sediments which are likely to be produced in the hot water passage will not contaminate the filtered water passage. Moreover, the main body 10 is simplified in structure and the manufacturing cost therefor is reduced.

In conclusion, the present invention provides the cold and hot water combination filtering faucet filtering apparatus so as to eliminate the troubles and shortcomings existing in the conventional faucet which is additionally equipped with filtering apparatus.

The above embodiments are used as examples of the present invention for illustration purpose only. Many derivations or modifications thereof can be made without departing from the spirit of the present invention. The scope of the present invention should be defined only by the appending claim.

What is claimed is:

1. A cold and hot water combination filtering faucet comprising a main body, a filter unit integrally disposed on said main body, and a water discharging tube; wherein said main body includes a cold raw water inlet and a hot raw water inlet on lateral sides, said cold raw water inlet extending to form a cold raw water passage which is open to said filter unit, said hot raw water inlet extending through the main body to communicate with said water discharging tube; and said filter unit comprises a filter housing and a cylindrical filter cartridge, said filter housing having a base portion for engaging with the main body and an interior for receiving said filter cartridge, said filter cartridge being formed with an inner hollow clear water area, a raw water area being defined between said filter housing and said filter cartridge, said clear water area communicating with a filtered water outlet of said main body which is connected with said water discharging tube, said cold raw water passage communicating with said raw water area, and wherein, said filtered water outlet is connected with a cold water discharge tube which is contained within said water discharging tube and coaxially extends therewith outside said main body said discharge tube and said discharging tube being constructed and arranged to maintain isolation between hot water passing through the discharging tube and cold filtered water passing through said discharge tube.

2. A faucet as claimed in claim 1, wherein a distal end of said cold water discharge tube protrudes outside a distal end of said water discharging tube.

3. A faucet as claimed in claim 2, wherein a retaining ring is fitted on said distal end of said water discharging tube, said retaining ring being formed with a central retaining hole to secure said cold water discharge tube in an interior of said distal end of said water discharging tube.

* * * * *